May 10, 1949. J. W. MARSH 2,470,041
VALVE STRUCTURE
Filed Aug. 8, 1945 2 Sheets-Sheet 1
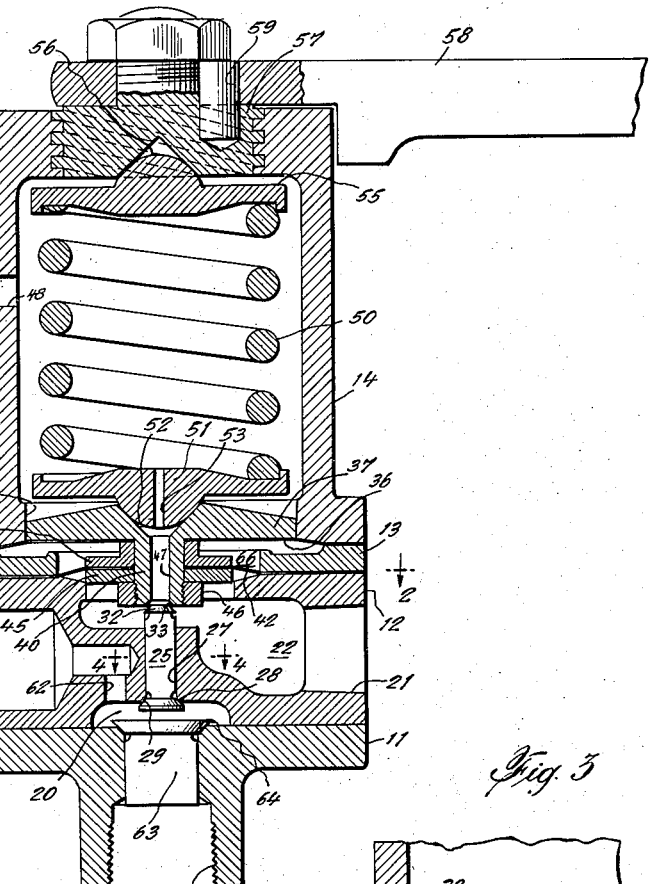

May 10, 1949. J. W. MARSH 2,470,041
VALVE STRUCTURE
Filed Aug. 8, 1945 2 Sheets-Sheet 2

Patented May 10, 1949

2,470,041

UNITED STATES PATENT OFFICE 2,470,041

VALVE STRUCTURE

John W. Marsh, Alexandria, Va.

Application August 8, 1945, Serial No. 609,547

14 Claims. (Cl. 303—53)

This invention relates to valve structures, and relates more particularly to a novel valve having a number of uses including use as an independent brake valve for automatic and manual control of locomotive brakes, without the use of supplementary valves such as distributing, feed, reducing and safety valves.

It is among the objects of this invention to provide a valve of the type described which will automatically apply and release locomotive brakes when a reduction or increase of train-line pressure is effected, and to permit the application, release and variation of pressure on locomotive brakes independently of automatic action. A further object of this invention is to provide a valve which in a simple and direct manner combines the functions of the independent and distributing valve with their auxiliary appurtenances, normally used for the automatic and independent control of locomotive brakes. Another object of the invention is the provision of a valve of the type described of the self-lapping type which will automatically maintain any desired locomotive brake-cylinder pressure, and which is simple to construct, understand, operate and maintain. A valve embodying the present invention may be used wherever it is desired to maintain a predetermined fluid pressure on any means proportionate to the fluid pressure applied to a second means, and to further control the proportion of fluid pressure applied to the first means.

The apparatus presently used for automatic and independent control of locomotive brakes comprises a distributing valve communicating with an automatic brake valve and an independent brake valve, a reducing valve, a safety valve and a double-heading cock, the construction, operation and arrangement of which are well known to those versed in the art.

In the drawing:

Fig. 1 is a central, vertical section taken through a self-lapping, independent air-brake valve embodying the present invention.

Fig. 2 is a section taken on line 2—2 of Fig. 1.

Fig. 3 is a broken section taken on line 3—3 of Fig. 2.

Fig. 4 is a horizontal section taken on line 4—4 of Fig. 1.

Figure 5:
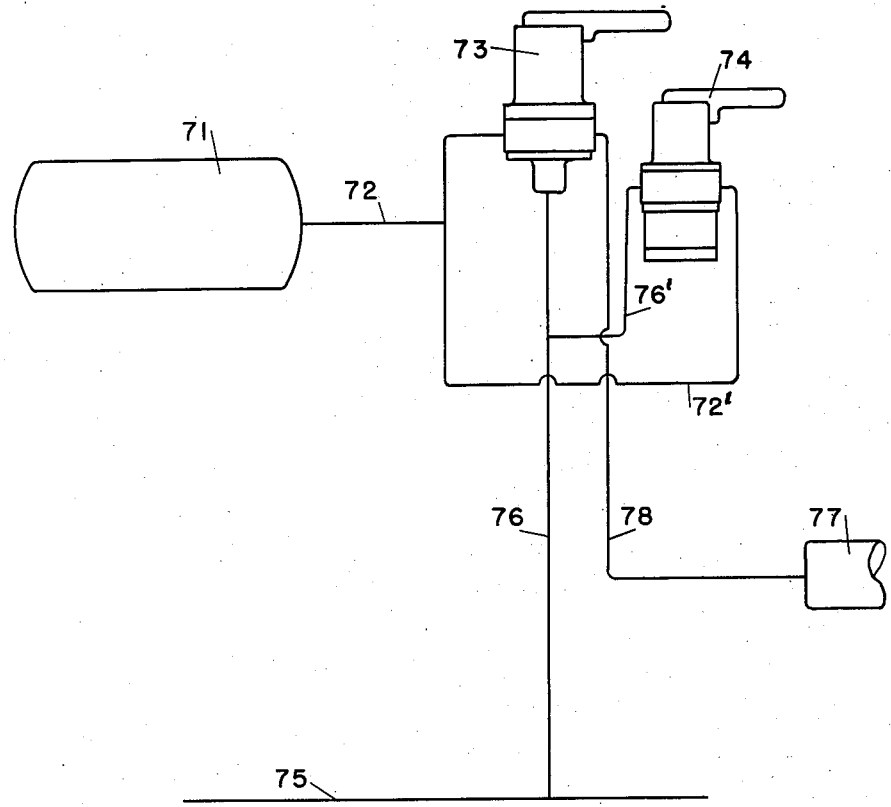
Fig. 5 is a diagrammatic view of an air brake system having the valve of the present invention included therein for controlling a locomotive brake.

The self-lapping, independent air-brake valve combining the functions of the conventional independent brake valve, distributing valve and reservoir, is illustrated in Figs. 1 to 4, inclusive. This valve combines the principles of the brake valve and triple valve, brake-cylinder pressure being controlled by train-line pressure acting against a spring, the spring load being controlled by the operator.

The housing for this valve is formed in a plurality of sections 11, 12, 13 and 14. Lower housing section 11 is provided with a control pressure port 18 leading to the train line. Housing section 12 is provided with an inlet port 19 from the main reservoir to chamber 20, and also with an outlet port 21 connecting the brake cylinder with chamber 22. Valve 25, which is formed with fluted sides, as shown at 26 in Fig. 4, is mounted for reciprocating movement in valve support 27 and is a double-seated valve. Thus, it is provided with a valve member 28 at its lower end, which is seated at 29, which constitutes a fixed seat. At its upper end it is formed with a valve member 32, which is seated at 33, which constitutes a floating seat.

A diaphragm 36 is carried on the lower surface of a piston element 37 which is slidably mounted in piston cylinder 38 at the lower end of housing section 14. The marginal edges of diaphragm 36 are secured between housing sections 13 and 14. Piston element 37 is formed on its lower surface with an extension 40 having a central aperture 41, constituting an exhaust conduit, valve seat 33 being formed at the lower end of said exhaust conduit. Another diaphragm 42 is mounted around its outer peripheral edges between housing sections 12 and 13, and associated with the upper surface of this diaphragm is a piston element 44, and associated with the lower surface of the diaphragm is a piston element 45. The exhaust conduit 40 extends through the parts 36, 44, 42 and 45.

Piston elements 44 and 45 are mounted on the exhaust conduit 40, and are secured thereon by means of a nut 46. The upper annular edge of upper piston element 44 secures the diaphragm 36 in sealed relation relative to piston element 37. A spring 50 mounted within upper housing section 14 engages at its lower end a spring cap 51 having a central projection 52 on its lower surface which is received within a generally conical opening in piston 37 communicating with conduit 40, such projection 52 aiding in centering the spring cap relative to piston 37. The spring cap is formed with a vertical aperture 53 which communicates with conduit 40. Thus, when valve member 32 is unseated, pressure in chamber 22 may be vented through apertures 47 and 53, and out through vent opening 48 to the external atmosphere. At its upper end, spring 50 engages a spring cap 55 having on its upper surface a ball portion 56 which is engaged by a sharp-pitched screw 57 mounted at the upper end of housing section 14. Relative downward and upward movement of screw 57 to load or unload spring 50 is effected by a handle 58 keyed, as at 59, to such screw.

In the initial setting of the valve, the handle 58 is manipulated to put downward mechanical pressure on the spring 50 and through the spring to the piston 37 until there is a balanced condition between the downward spring pressure and the upward fluid pressure acting respectively on opposite sides of said piston.

Main reservoir pressure has access to chamber 20 through port 62, which chamber is normally closed to train-line control pressure port 18 by means of a check valve 63 which is seated at 64. Chamber 66 between diaphragms 36 and 42 is open to train-line pressure through port 67 (Fig. 3). From the foregoing, it will be seen that brake-cylinder pressure is controlled by train-line pressure acting against spring 50, such pressure acting against upper diaphragm 36. The spring load in spring 50 is controlled by the operator through the medium of handle 58. A plurality of aligned, vertical apertures 70 are provided in the several housing sections which receive bolts (not shown) for assembling the housing structure.

When the valve is in running position, as when the locomotive is running, reduction in train-line pressure brought about in any usual or preferred manner, will close seat 33 and open seat 29 due to the reduction of pressure in chamber 66, such pressure acting on diaphragm 36. Thus, air from the main reservoir passes through port 62 and into chamber 20, past valve seat 29 into chamber 22, and thence to the brake cylinder. This passage of air continues until the pressures balance. The brake-cylinder pressure, however, can be further governed by operating the valve handle to alter the spring pressure applied, thus decreasing or releasing such pressure, or to apply and release the locomotive brakes without reduction of train-line pressure. Check valve 63 is provided in order that the locomotive can be operated dead in a train, in which case the main reservoir acts as the auxiliary reservoir for the dead locomotive brakes, and the independent brake valve thus becomes the triple valve. In the event of train line failure, the locomotive brakes are applied from the main reservoir, check valve 63 being held seated.

With the valve handle in running position, as above stated, a predetermined downward pressure is exerted by spring 50 on piston 37 and associated elements, including diaphragm 36, piston elements 44, 45, diaphragm 42, and valve seat 33, thus closing seat 33 and opening seat 29. This permits fluid under pressure supplied from a suitable source, as a main reservoir, to flow from chamber 20 past seat 29, through flutes 26 in valve 25 to chamber 22, and to fluid-pressure-utilizing means such as brake cylinders communicating with port 21. The fluid pressure which thus accumulates in chamber 22 also acts upwardly against piston element 45 and diaphragm 42, against the downward pressure of spring 50. Thus, when the fluid pressure in chamber 22 and communicating means acting on piston 45 and diaphragm 42, exerts sufficient upward pressure to overcome the downward pressure of spring 50, piston 45 and associated elements will rise, permitting valve 28 to close seat 29 and prevent further flow of fluid from chamber 20.

Fluid pressure from an associated source, such as the train line of an air-brake system, communicating through ports 18 and 67 with chamber 66, exerts a downward pressure on piston 44 and diaphragm 42, and exerts an upward pressure on diaphragm 36 and piston 37. The effective area of diaphragm 42 is less than the effective area of diaphragm 36. Accordingly, the train-line pressure, acting conjointly with fluid pressure in chamber 22, will oppose the downward pressure of spring 50. When the train line is re-charged and such train-line pressure reaches a predetermined amount, piston 37 and seat 33 will be raised off valve 32, releasing fluid pressure in chamber 22 and associated means, by the flow of fluid past seat 33 through ports 47, 53, 48 to exhaust. Thus, it will be apparent that any predetermined fluid pressure in chamber 22 and associated means is maintained by a controlled fluid pressure at port 18. It will also be clear that the unit fluid pressure in chamber 22, multiplied by the effective area of diaphragm 42, will be equal to the downward pressure of spring 50, less the net upward pressure on piston 37 exerted by fluid pressure in chamber 66, and less the net upward pressure exerted on valve 28 by fluid pressures in chamber 20 and in chamber 22. Since the effective area of valve 28 is relatively small, the effect of the pressure on valve 28 is normally not appreciable.

For an understanding of the operation of the present invention, reference is made to Figure 5, wherein the valve of the present invention is indicated at 73 which is connected to a source of pressure 71 by a conduit 72 coupled to the valve 73 at the inlet port 19. A conduit 78 leads from the outlet port 21 of the valve to one end of the brake cylinder 77 of a locomotive brake. The control pressure port 18 of the valve is connected to a conduit 76 which leads to a train line conduit 75. The system also includes a valve 74 for use in controlling the train-line or brake line pressure, which valve may be of any well known or preferred type and may have the construction shown in my co-pending application Serial No. 596,657, now Patent No. 2,450,480, granted October 5, 1948. This valve is connected by a conduit 76' with the train-line conduit 75 and preferably to the conduit 76 which is connected to the train line conduit 75. The valve 74 is also connected by the branch conduit 72' to the conduit 72 which is connected to the source of pressure 71.

Referring to Figures 1 and 5, it will be explained that by manipulation of the handle of the valve 74, fluid pressure from the reservoir 71 may be conducted through the valve 74, the conduits 76' and 76 to the train-line conduit 75 for the purpose of charging the train-line to the desired pressure. While charging the train-line, the pressure from the tank 71, which is conducted to the port 19 of the present valve 73, passes into the chamber 20 and closes the valves 28 and 63.

Under normal running conditions of a locomotive with the brake off, locomotive brake cylinder 77 is in communication with the atmosphere through the conduit 78, the port 21, the passages 47 and 53 and the vent 48 in the valve casing. In order that the bottom of the passage 47 may be maintained open under these conditions, the effective area of the diaphragm 36 is greater than that of the diaphragm 42, whereby train-line pressure, see Figure 3, through the by-pass 67 is conducted to the chamber 66 defined by the diaphragms 36 and 42, and this pressure is such as to overcome the downward pressure of the spring 50 so as to elevate the piston 37 and associated parts into a position such that the valve seat 33 at the bottom of the exhaust conduit 40 is above the valve 32, thereby to maintain an open passage from the port 21 to the vent opening 48.

In order to apply the brake, the handle 58 of the valve of the present invention is manipulated to apply downward pressure on the spring 50 such as will force down the piston 37 and associated parts until the lower end of the exhaust conduit 40 engages the valve 32 and closes the valve seat 33, thus cutting off communication from the valve cylinder 77 to the vent 48 in the casing of the valve 13. Further downward movement of the piston 37 and associated parts will move the stem 25 downwardly thus opening the valve port 29 and establishing communication from the source of pressure 71 to the inlet port 19, thence through the passage 62, thence upwardly along the grooves or passages 26 in the valve stem 25, into the brake chamber 22 and then out through the port 21 into what was the exhaust end of the cylinder 77 thus applying the brake.

The brake may be released by manipulating the handle 58 to reduce the pressure on the spring 50 to an extent that the pressure from the train line passing through the passage 67, see Figure 3, into the chamber 66, will be such as to lift the piston 37 and associated parts, thus removing downward mechanical pressure on the valve stem 25, whereupon reservoir pressure in the chamber 20 will close the valve 28 and cut off the supply of reservoir pressure to the chamber 22 and to the brake cylinder 77. The handle 58 should be so manipulated that the lower end of the conduit 40 will lie above the valve member 32 at the top of the valve stem 25 and thereby establish an unobstructed passage from the brake cylinder 77 to the vent opening 48.

Should the train-line pressure become abnormally low or fail altogether, spring 50 will automatically come into operation and lower the conduit 40 into contact with the valve 32, thus closing the port 33, and forcing the valve stem 25 downwardly and opening the port 28, thus admitting reservoir pressure upwardly through the channels 26 of the valve stem 25 into the chamber 22 and thence to the brake cylinder 77 thus automatically applying the brake.

Reduction of pressure in the train-line 75 may be accomplished by manipulation of the valve 74 or in any other preferred manner, for establishing communication, through the valve of the present invention, from the pressure reservoir to the brake cylinder for applying the brake.

It will be further apparent that when the net upward pressure applied by fluid pressure in chamber 66 is equal to the downward pressure of spring 50, no fluid pressure will exist in chamber 22. Also, with a predetermined downward spring pressure, the unit fluid pressure in chamber 22 will be substantially equal to the reduction in unit fluid pressure in chamber 66 from that required to raise seat 33 of valve 32, multiplied by the ratio between net effective areas of diaphragms 36 and 42.

From the foregoing, it will be apparent that if downward pressure of spring 50 is reduced, the effect on the fluid pressure in chamber 22 will be the same as in increase of fluid pressure in chamber 66. Conversely, if the downward pressure of spring 50 is increased, the effect on the fluid pressure in chamber 22 will be the same as a decrease of fluid pressure in chamber 66. Thus, any fluid pressure applied in chamber 22 and associated means by application of fluid pressure at port 18 can be increased or decreased by changing downward pressure of spring 50 through rotation of screw 57 relative to housing 14 by handle 58. Moreover, any fluid pressure applied in chamber 22 by downward pressure of spring 50 can be increased or decreased by changing fluid pressure at port 18.

Furthermore, any predetermined fluid pressure will be maintained in chamber 22 and associated means by positioning handle 58, or by controlling fluid pressure at port 18, as long as a source of sufficient fluid pressure is available at port 19, since any reduction of such predetermined fluid pressure in chamber 22 will open seat 29 to admit more fluid under pressure to chamber 22, and any increase of predetermined fluid pressure in chamber 22 will open seat 33 to exhaust surplus fluid from chamber 22.

Check valve 63 is positioned between port 18 and chamber 20, seating at 64. Seat 64 remains closed as long as fluid pressure at port 19 exceeds train-line pressure at port 18. When a locomotive is being hauled dead in a train, the main reservoir on the dead locomotive is charged from the train line at port 18, check valve 63 being raised by excess fluid pressure in the train line, and such fluid flowing into chamber 20, through ports 62, 19 to the main reservoir. The main reservoir thus acts as an auxiliary reservoir to supply fluid for the operation of the locomotive brakes. The functions of the valve in automatically and independently controlling the locomotive brakes are not affected thereby as the control by train-line pressure is effected through port 67 which is between check valve 63 and train-line port 18.

In the event of train line failure, brakes are automatically applied by reduction in pressure in chamber 66. However, the automatic application can be released by positioning handle 58, and the locomotive brakes can be operated independently of the train line as long as fluid under pressure is available in the main reservoir and applied at port 19.

While one form or embodiment of the invention has been shown and described herein for illustrative purposes, and the construction and arrangement incidental to a specific application thereof have been disclosed and discussed in detail, it is to be understood that the invention is limited neither to the mere details or relative arrangement of parts, nor to its specific embodiment shown herein, but that extensive deviations from the illustrated form or embodiment of the invention may be made without departing from the principles thereof.

What I claim is:

1. A fluid pressure control valve comprising a housing having a plurality of ports including an inlet port, a control pressure port, and an outlet port, a brake chamber communicating with said outlet port, a pair of fluid-tight elements of unequal area defining a closed chamber, said fluid-tight elements being interconnected for conjoint reciprocating movement, the exterior face of one of said fluid-tight elements being subject to fluid pressure in said outlet port and the interior faces of both of said elements being subject to fluid pressure in said control pressure port, resiliently compressible means applied to said fluid-tight elements to oppose said fluid pressure in said outlet port, means to operatively control the pressure exerted by said resiliently compressible means, an exhaust conduit extending through said fluid-tight elements and leading from the brake chamber to the external atmosphere, a multiple valve element provided with a plurality of valve portions, a fixed seat for one of the valve portions normally closing the inlet ports to the brake chamber, and a valve seat provided on the inlet end of said exhaust conduit adapted to be closed by a second portion of the valve element, the fixed seat of the valve element being opened by a reduction in control pressure acting between said diaphragms, thereby venting fluid under pressure in the inlet port to aforesaid chamber and aforesaid outlet port.

2. A fluid pressure control valve comprising a housing having a plurality of ports including an inlet port, an outlet port, and a control pressure port, a brake chamber communicating with said outlet port, a pair of fluid-tight elements of unequal area, said fluid-tight elements being interconnected for conjoint reciprocating movement, the exterior face of one of said fluid-tight elements being subject to fluid pressure in said outlet port and the interior faces of both of said elements being subject to fluid pressure in said control pressure port, resiliently compressible means applied to said fluid-tight elements to oppose said fluid pressure in said outlet port, means to operatively control the pressure exerted by said resiliently compressible means, an exhaust conduit carried by and extending through said fluid-tight elements a multiple valve element provided with a plurality of valve portions, a fixed seat for one of the valve portions normally closing the inlet port to the brake chamber, and a seat for the inlet end of the exhaust conduit adapted to be closed by a second portion of said valve element, the fixed seat of the valve element being opened by reduction of fluid pressure in the control pressure port acting between said fluid-tight elements, thereby venting fluid under pressure in said inlet port to said chamber and said outlet port.

3. A fluid pressure control valve comprising a housing having a plurality of ports including an inlet port, an outlet port, and a control pressure port, a brake chamber communicating with said outlet port, a pair of fluid-tight elements of unequal area, said fluid-tight elements being interconnected for conjoint reciprocating movement, the exterior face of one of said fluid-tight elements being subject to fluid pressure in said outlet port and the interior faces of both of said elements being subject to fluid pressure in said control pressure port, resiliently compressible means applied to said fluid-tight elements to oppose said fluid pressure in said outlet port, means to operatively control the pressure exerted by said resiliently compressible means, an exhaust conduit carried by and extending through said fluid-tight elements, a multiple valve element provided with a plurality of valve portions, a fixed seat for one of the valve portions normally closing the inlet port to the chamber, and a seat for the exhaust conduit adapted to be closed by a second portion of said valve element, the fixed seat of the valve element being opened by reduction of fluid pressure in the control pressure port acting between said fluid-tight elements, thereby venting fluid under pressure in said inlet port to said chamber and said outlet port, the effect of said fluid pressure reduction being subject to control by controllable variation of pressure on said resiliently compressible means.

4. A fluid pressure control valve comprising a housing having a plurality of ports including an inlet port, a control pressure port and an outlet port, a chamber communicating with said outlet port, means within said chamber to admit fluid under pressure from said inlet port to said outlet port by and in proportion to reduction of fluid pressure in said pressure control port, and a check valve for said pressure control port and subject to pressure on opposite sides from said control and inlet ports respectively, said control pressure port whereby fluid under pressure may flow from said pressure control port to said inlet port when fluid pressure in said pressure control port exceeds fluid pressure in said inlet port.

5. In a fluid pressure system having a source of fluid under pressure, a fluid pressure applying element, and means for controlling the flow of fluid under pressure from said source to said pressure applying element, the combination of a valve device for applying pressure in said pressure applying element comprising a housing having a pressure applying chamber connected with the means for applying fluid pressure, said chamber being provided with a valve inlet port communicating with the source of fluid pressure, and a pressure control inlet port communicating with said means for controlling the flow of fluid pressure, a pair of fluid-tight elements of unequal areas, said fluid-tight elements being interconnected for conjoint reciprocating movement, the external face of one of said fluid-tight elements being subject to fluid pressure within said chamber and the interior faces of both said elements being subjected to fluid pressure in said pressure control port, operatively controllable pressure means applied to said fluid-tight elements to oppose fluid pressure within said chamber, and valving means within said chamber actuated by reduction of fluid pressure between said fluid-tight elements to provide communication between said inlet port and said outlet port and actuated by increase of fluid pressure between said fluid-tight elements to provide communication between said outlet port and the external atmosphere.

6. In a fluid pressure system having a source of fluid under pressure, a pressure applying element, and means for controlling the flow of fluid under pressure from said source to said pressure applying element, the combination of a valve device for applying pressure in said pressure applying element through reduction in pressure from the source and comprising a housing having a pressure applying chamber and a plurality of ports including an inlet port communicating with the source of fluid pressure, an outlet port communicating with the pressure applying element, and a fluid pressure control inlet port communicating with said means for controlling the flow of fluid pressure, a pair of spaced fluid-tight elements of unequal areas and defining a closed compartment, said fluid-tight elements being interconnected for conjoint reciprocating movement, the external face of one of said fluid-tight elements being subject to fluid pressure within said chamber and the interior faces of both said elements being subjected to fluid pressure in said pressure control port, an exhaust conduit carried by the fluid-tight elements and leading from the chamber operatively controllable pressure means applied to said fluid-tight elements to oppose fluid pressure within said chamber, a check valve positioned between said inlet port and said pressure control port whereby fluid under pressure may flow from said pressure control port to said inlet port when fluid pressure in said pressure control port exceeds fluid pressure in said inlet port, and valving means within said chamber operating under reduction of fluid pressure between said fluid-tight elements to provide communication between said inlet port and said outlet port and operating under increase of fluid pressure between said fluid-tight elements to provide communication from said chamber through said exhaust.

7. In a fluid pressure system having a source of fluid under pressure, a pressure applying element, and means for controlling the flow of fluid under pressure from said source to said pressure applying element, the combination of a valve device for applying pressure in said pressure applying element and comprising a housing having a pressure applying chamber and a plurality of ports including an inlet port communicating with the source of fluid pressure and an outlet port communicating from the chamber to the pressure applying element, a pair of fluid-tight elements of unequal areas, the exterior face of one of said fluid-tight elements being subject to fluid pressure in said chamber and the interior faces of said fluid-tight elements being subject to fluid pressure from said source, operatively controllable pressure means applied to said fluid-tight elements to oppose fluid pressure in said chamber, and valving means within said chamber for maintaining fluid pressure in said chamber by and in proportionate to reduction in fluid pressure from said source, said proportion being varied by aforesaid operatively controllable pressure means applied to said fluid-tight elements.

8. In a fluid pressure system having a source of fluid under pressure, a fluid pressure applying element, and means for controlling the flow of fluid under pressure from said source to said pressure applying element, the combination of a valve device for applying pressure in said element and comprising a housing having a plurality of ports including an inlet port communicating with said source, a control pressure port communicating with said pressure control means and an outlet port communicating with said fluid pressure applying element, a chamber communicating with said outlet port, a pair of fluid-tight elements of unequal area, said fluid-tight elements being interconnected for conjoint reciprocating movement, the exterior face of one of said fluid-tight elements being subject to fluid pressure in said chamber and the interior faces of both of said elements being subject to fluid pressure in said control pressure port, resiliently compressible means applied to said fluid-tight elements to oppose fluid pressure in said chamber, means to operatively control the pressure exerted by said resiliently compressible means, an exhaust conduit carried by and extending through the fluid-tight elements and leading outwardly from the chamber, a multiple valve element provided with a plurality of valve portions, a fixed seat for one of the valve portions normally closing the inlet port to the chamber, and a seat for the exhaust conduit associated with the first fluid-tight element adapted to be closed by a second portion of the valve element, the fixed seat of the valve element being opened by reduction of fluid pressure in the control pressure port, thereby venting fluid from the inlet port to the chamber, the exhaust conduit seat being opened by increase of fluid pressure in the control pressure port, thereby venting fluid from the chamber to exhaust, the fluid pressure in said chamber being maintained in proportion to reduction in fluid pressure from the source, said proportion being operatively controlled by resiliently compressible means.

9. In a fluid pressure system having a source of fluid under pressure, a pressure applying element, and means for controlling the flow of fluid under pressure from said source to said pressure applying element, the combination of a valve device for applying pressure in said element and comprising a housing having a plurality of ports including an inlet port communicating with said source, a control pressure port communicating with said pressure control means and an outlet port communicating with said pressure applying element, a chamber communicating with said outlet port, a pair of fluid-tight elements of unequal area, said fluid-tight elements being interconnected for conjoint reciprocating movement, the exterior face of one of said fluid-tight elements being subject to fluid pressure in said chamber and the interior faces of both of said elements being subject to fluid pressure in said control pressure port, resiliently compressible means applied to said fluid-tight elements to oppose fluid pressure in said chamber, means to operatively control the pressure exerted by said resiliently compressible means, the first fluid-tight element having an exhaust port, a multiple valve element provided with a plurality of valve portions, a fixed seat for one of the valve portions normally closing the inlet port to the chamber, and a seat for the exhaust port associated with the first fluid-tight element adapted to be closed by a second portion of the valve element, the fixed seat of the valve element being opened by reduction of fluid pressure in the control pressure port, thereby venting fluid from the inlet port to the chamber, the exhaust port seat being opened by increase of fluid pressure in the control pressure port, thereby venting fluid from the chamber to exhaust, the fluid pressure in said chamber being maintained in proportion to reduction in fluid pressure from the source, said proportion being operatively controlled by resiliently compressible means, and a check valve positioned between said inlet port and said control pressure port whereby fluid under pressure may flow from said pressure control port to said inlet port when fluid pressure in said control pressure port exceeds fluid pressure in said inlet port.

10. A valve for controlling fluid pressure in a pressure utilizing means, said valve comprising a housing having a plurality of ports including an inlet port which may be connected with a source of fluid under pressure, a control pressure port which may be connected with a means for controlling fluid pressure from a source, and an outlet port which may be connected with a pressure utilization means, a chamber communicating with said outlet port, a first fluid-tight diaphragm subject to fluid pressure in said chamber, a second fluid-tight diaphragm of larger area than said first diaphragm, said diaphragms being spaced apart and interconnected for conjoint reciprocating movement within said housing, the space between said diaphragms being subject to the fluid pressure in said control pressure port, resiliently compressible means acting on said diaphragms to oppose fluid pressure in said chamber and means to operatively control pressure of said means, the first fluid-tight diaphragm having an exhaust port communicating with the external atmosphere, a multiple valve element provided with a plurality of valve portions and actuated by reciprocating movement of said diaphragms, a fixed seat for one of the valve portions normally closing the inlet port to the chamber, a seat for the exhaust port associated with the first fluid-tight diaphragm adapted to be closed by a second portion of the valve element, and a check valve positioned between said inlet port and said control pressure port to prevent flow of fluid under pressure from said inlet port to said control pressure port.

11. A fluid pressure control valve for use in a fluid pressure system having means for utilizing fluid pressure, a source of fluid pressure, a conduit providing communication between said source and said valve, and means for controlling fluid pressure in said conduit, said valve comprising a housing having a chamber communicating with said conduit and with said utilizing means, a plurality of fluid-tight elements and capable of conjoint movement, one of said fluid-tight elements being subject to conduit pressure and another of said fluid-tight elements being subject to pressure applied to the utilizing means, the effective areas of said fluid-tight elements being such that the sum of the total pressure effected by a predetermined fluid pressure on said fluid-tight element subject to conduit pressure, plus the total pressure effected by a predetermined fluid pressure on said fluid-tight element subject to utilizing means pressure, is equal to a predetermined total pressure, means for applying elastic pressure on said fluid-tight elements substantially equal to aforesaid total pressure and means to operatively control said elastic pressure, an exhaust port providing communication between said chamber and the external atmosphere, an inlet port providing communication between said chamber and said conduit, and a multiple valve element actuated by said fluid-tight elements, adapted to close said exhaust port and open said inlet port consecutively when the combined fluid pressures on said fluid-tight elements are less than the operatively controlled elastic pressure opposing said fluid pressures, to close said inlet port when said combined fluid pressures equal said operatively controlled elastic pressure, and to open said exhaust port when said combined fluid pressures exceed said operatively controlled elastic pressure.

12. In a fluid pressure system having a source of fluid under pressure, a pressure applying element, and means for controlling the flow of fluid under pressure from said source to said pressure applying element, the combination of a valve device for applying pressure in said element through reduction in controlled pressure and comprising a housing having a plurality of ports including an inlet port connected with the source of fluid pressure, a control port connected with said control means, an outlet port connected with said pressure applying element, and an exhaust port, a pair of fluid-tight elements positioned within said housing and having a space therebetween, said fluid-tight elements being interconnected for conjoint reciprocating movement therein, the space between said diaphragms being subject to fluid pressure in said control port, one of said fluid-tight elements being subject to fluid pressure in said outlet port, controllable means for applying resilient pressure on said fluid-tight elements to oppose said outlet port fluid pressure, and a valve actuated by said fluid-tight means whereby communication is effected between said inlet port and said outlet port by downward movement of said valve elements, and whereby communication is effected between said outlet port and said exhaust port by upward movement of said fluid-tight elements.

13. A fluid pressure control valve comprising a housing having a plurality of ports, a pair of spaced interconnected fluid-tight elements of unequal areas positioned within said housing and capable of conjoint reciprocating movement therein, means for applying elastic pressure on said fluid-tight elements, an inlet control port communicating with the space between said fluid-tight elements, an outlet port communicating with one of said fluid-tight elements whereby fluid pressure in said outlet port opposes aforesaid elastic pressure, an inlet port and an exhaust port, and a valve element positioned between said inlet port and said outlet port, said valve element having a first seat effecting communication between said inlet port and said outlet port, and a second seat effecting communication between said outlet port and said exhaust port, said valve element being actuated by movement of said fluid-tight elements.

14. The valve recited in claim 13 and provided with a check valve for the control port and subject to fluid pressure on opposite sides from said control and inlet ports respectively, said check valve closing said control port when fluid pressure in said inlet port exceeds fluid pressure in said control port.

JOHN W. MARSH.

REFERENCES CITED

The following references are of record in the file of this patent:

UNITED STATES PATENTS

| Number | Name | Date |
|---|---|---|
| 971,207 | Michel | Sept. 27, 1910 |
| 1,932,079 | Livingston | Oct. 24, 1933 |
| 2,015,181 | Hildebrand et al. | Sept. 24, 1935 |
| 2,135,007 | Kamcharovic | Nov. 7, 1938 |
| 2,289,559 | Turek | July 14, 1942 |